United States Patent
Zamir et al.

(10) Patent No.: US 11,907,535 B2
(45) Date of Patent: Feb. 20, 2024

(54) STORAGE DEVICE OPTIMIZATIONS IN PROOF OF SPACE BLOCKCHAIN SYSTEMS

(71) Applicant: Western Digital Technologies, Inc., San Jose, CA (US)

(72) Inventors: Ran Zamir, Ramat Gan (IL); David Avraham, Even Yehuda (IL); Alexander Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/584,020

(22) Filed: Jan. 25, 2022

(65) Prior Publication Data
US 2023/0259279 A1   Aug. 17, 2023

(51) Int. Cl.
| | | |
|---|---|---|
| G06F 3/06 | (2006.01) | |
| G06F 3/00 | (2006.01) | |
| H03M 13/13 | (2006.01) | |
| H03M 13/00 | (2006.01) | |

(52) U.S. Cl.
CPC .......... *G06F 3/0608* (2013.01); *G06F 3/0644* (2013.01); *G06F 3/0683* (2013.01); *H03M 13/13* (2013.01); *H03M 13/611* (2013.01)

(58) Field of Classification Search
CPC .... G06F 3/0608; G06F 3/0644; G06F 3/0683; H03M 13/13; H03M 13/611
See application file for complete search history.

(56) References Cited

U.S. PATENT DOCUMENTS

| | | | |
|---|---|---|---|
| 9,021,158 B2 * | 4/2015 | Hyun | G06F 3/0679 710/39 |
| 2013/0205085 A1 * | 8/2013 | Hyun | G06F 3/0611 710/5 |
| 2019/0179685 A1 | 6/2019 | Ki | |

(Continued)

OTHER PUBLICATIONS

"Error correction code," Wikipedia, Retrieved from Internet URL: https://en.wikipedia.org/w/index.php?title=Error_correction_code &oldid=%201067146737, last edited on Jan. 22, 2022, pp. 13 (Jan. 22, 2022).

(Continued)

*Primary Examiner* — Justin R Knapp
(74) *Attorney, Agent, or Firm* — Rutan & Tucker LLP; Hani Z. Sayed; Ravi Mohan

(57) ABSTRACT

Storage devices are configured to be utilized in a variety of blockchain related activities that rely on a proof of space consensus model. These storage devices are required to process a lot of read and write cycles on their memory devices to generate the desired proof of space consensus data. The generation and storing of this generated data requires very different types of memory device usage. Storage devices may be configured to optimize these different usage types upon detecting these proof of space blockchain activities. These optimizations can include suspending one or more background or other garbage collection activities. Additional optimizations can further include configuring partitions or namespaces to comprise single-level-cell majority or single-level-cell only memory devices to increase writing speeds. Further optimizations can include interleaving or extending the length of error correction codes. These optimizations, while not suitable for general use, are suitable for proof of space blockchain activities.

10 Claims, 12 Drawing Sheets

(56) References Cited

U.S. PATENT DOCUMENTS

| | | |
|---|---|---|
| 2019/0278506 A1 | 9/2019 | Richardson |
| 2019/0303846 A1* | 10/2019 | Kaweske ............... G16H 20/10 |
| 2020/0409581 A1 | 12/2020 | Oh et al. |
| 2023/0139330 A1* | 5/2023 | Lee ....................... H04L 9/0894 713/193 |
| 2023/0185459 A1* | 6/2023 | Steinmetz ............. G06F 3/0619 711/156 |
| 2023/0185476 A1* | 6/2023 | Bert ..................... G06F 3/0604 711/154 |
| 2023/0186289 A1* | 6/2023 | Bert ..................... G06F 3/0659 705/64 |

OTHER PUBLICATIONS

"Proof of Space," Wikipedia, Retrieved from Internet URL:https://en.wikipedia.org/wiki/Proof_of_space, last edited on Dec. 6, 2022, pp. 3 (Dec. 6, 2022).

Suhler, P., and Carlson, M., "Managing Capacity in NVM Express SSDs", Storage Developer Conference, Santa Clara, CA, pp. 1-18, (Sep. 23-26, 2019).

* cited by examiner

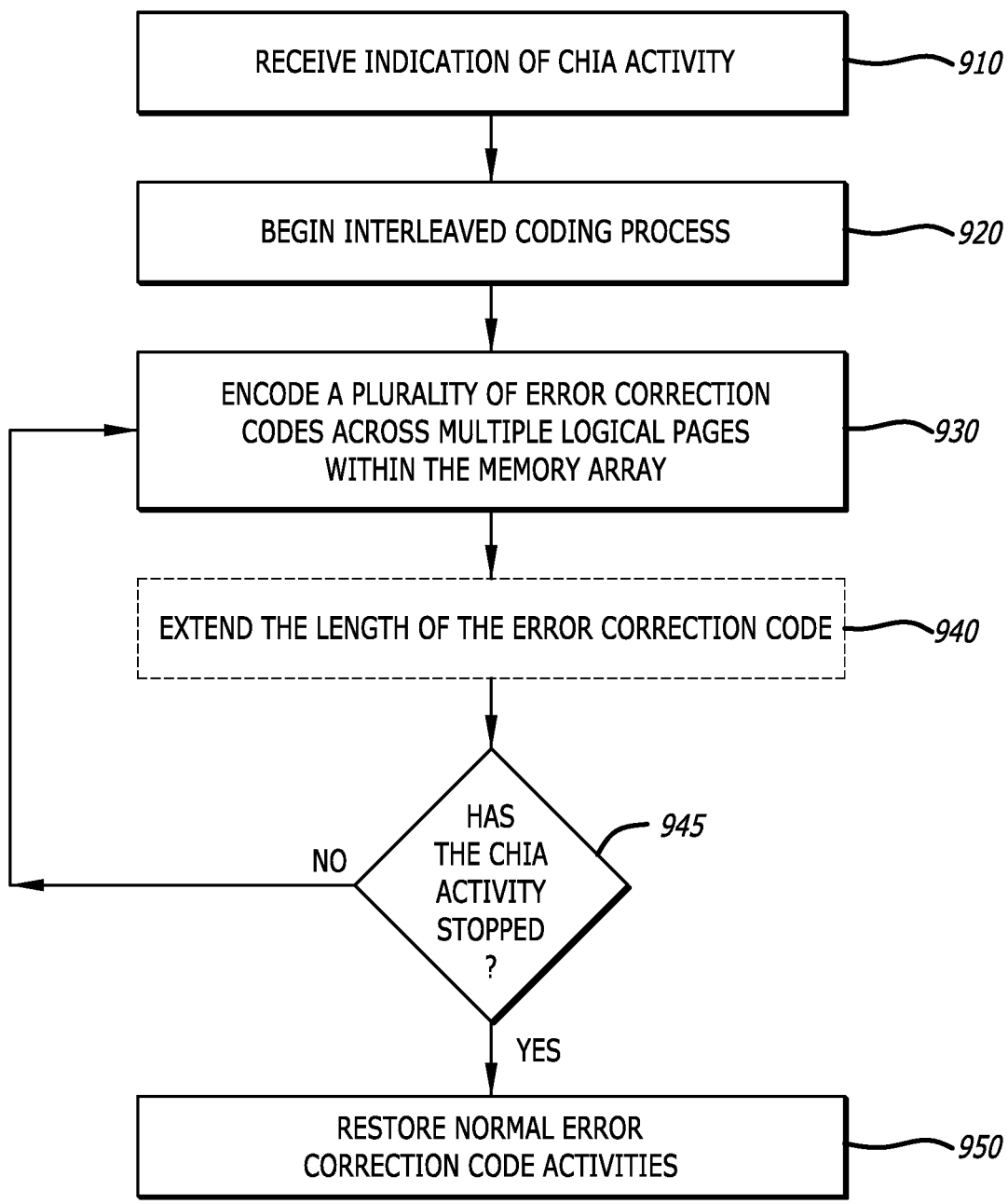

US 11,907,535 B2

STORAGE DEVICE OPTIMIZATIONS IN PROOF OF SPACE BLOCKCHAIN SYSTEMS

FIELD

The present disclosure relates to storage systems. More particularly, the present disclosure relates to optimizing storage device settings and processes in systems utilized for proof of space blockchain applications.

BACKGROUND

Storage devices are ubiquitous within computing systems. Recently, solid-state storage devices (SSDs) have become increasingly common. These nonvolatile storage devices can communicate and utilize various protocols including non-volatile memory express (NVMe), and peripheral component interconnect express (PCIe) to reduce processing overhead and increase efficiency.

The increased write and read speeds of SSDs have made them an attractive choice for an increasing number of applications. Once of these applications is for the generation of data for blockchain operations. Traditional blockchain processes utilize a proof of work method to generate consensus across a network. However, this process is becoming increasingly criticized for the increased demand being placed on computer central processing units (CPUs) and graphical processing units (GPUs) which are required to generate the proof of work data. This increased demand has led to a shortage of these parts as well as increased the overall use of electricity, contributing to electrical waste.

In response, a series of blockchain systems have been implemented that utilize a proof of space consensus method. Instead of generating calculations in CPUs and GPUs, a series of specialized data is stored within a storage device. This data is then recalled by the network to form a consensus model. Thus, storage device space is the commodity utilized instead of CPUs and GPUs. The generation of the data for these proof of space methods requires a lot of processing read and write cycles which creates a higher demand for the faster processing capabilities of SSDs. However, once generated, the resultant data can be stored elsewhere and only needs to be accessed relatively infrequently.

These proof of space blockchain activities can often use the memory devices within a memory array in a much different way compared to traditional data storage from host-computing devices. For example, plotting proof of space data, such as with Chia plotting, can create a known fixed area that will have a large number of data writes with relatively fewer data reads. This plotted data will then often be moved to another storage device or partition upon finalization of the plot. This different usage pattern can lead to inefficiencies within the storage device as traditionally configured.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 9 is a flowchart depicting a process for modifying the use of error correction codes upon the detection of proof of space blockchain activities in accordance with an embodiment of the disclosure;

Figure 1:
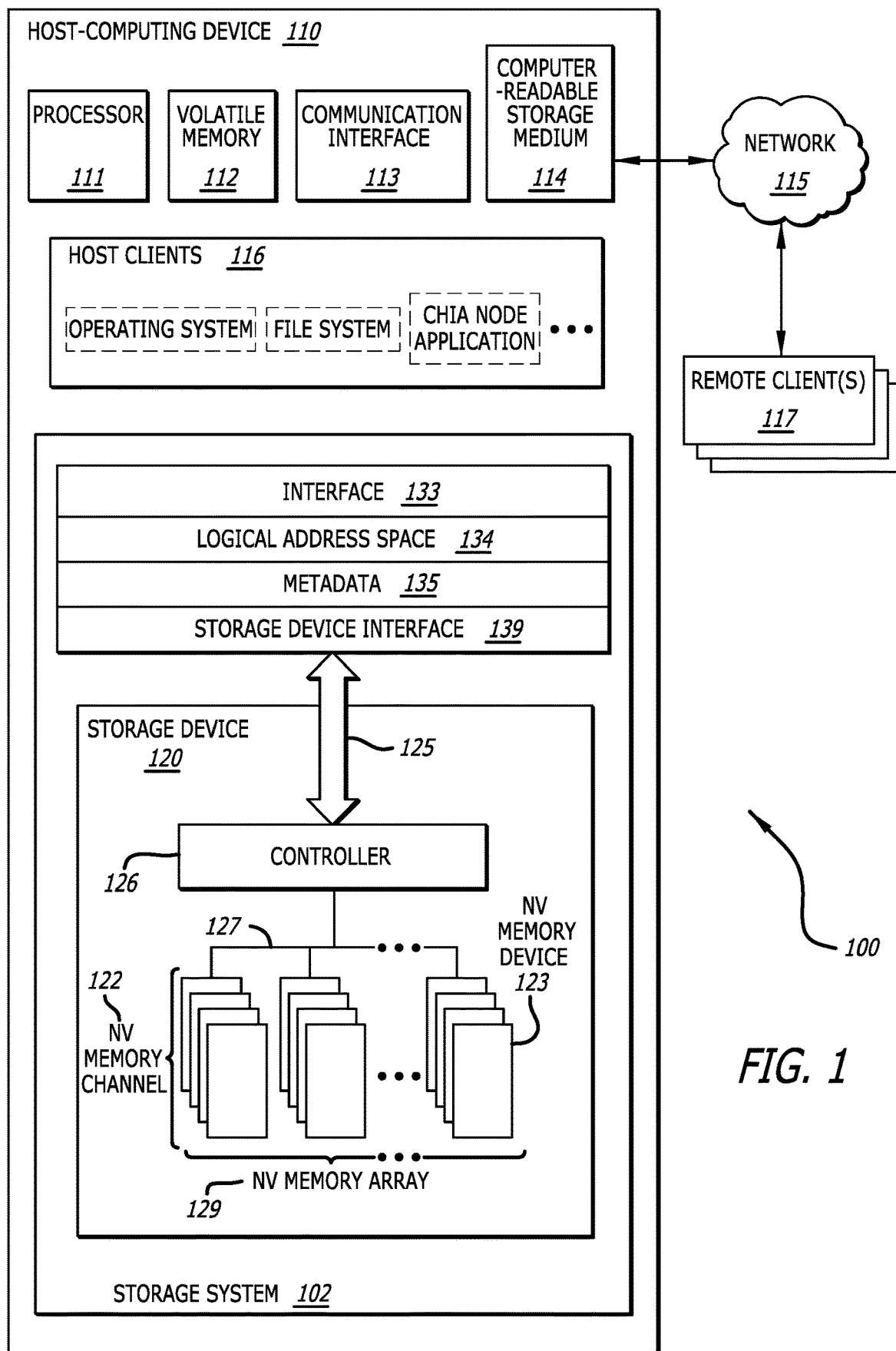
FIG. 1 is a schematic block diagram of a host-computing device with a storage device suitable for proof of space memory array optimization in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that provide for optimization of storage devices upon detection or signaling of proof of space blockchain activities. More specifically, many embodiments can suspend certain background processes, configure memory devices for partitions, and modify the use of error correction codes. By performing these operations, the speed and/or endurance of the memory devices being utilized for proof of space blockchain activities can be increased. Many of these operations performed upon detection or signaling of proof of space blockchain activities may be disadvantageous within traditional memory array usage, but can offer benefits when being utilized for these blockchain activities, such as plotting.

In a number of embodiments, the storage device can determine certain background operations or garbage collection actions that are not necessary when dealing with data reading and writing patterns of certain proof of space blockchain activities. Often, this is due to the fact that data is written to the memory devices often, but is not read relatively often. Additionally, certain blockchain activities, such as generating plots for Chia blockchains, can operate within known and predictable patterns, spaces, or sizes. Having a knowledge of these predictable actions can allow for the suspension of background activities that are not needed in light of these modified usage patterns.

In further embodiments, a memory array may be comprised of a number of configurable memory devices. These memory devices may be configurable to be utilized as single-level cell ("SLC") memory devices, triple-level cell ("TLC"), or quad-level cell ("QLC") memory devices. These configurable memory devices can be changed based on the desired task and/or partition or namespace being requested by the host-computing device. Often, to provide fast data transfer, a portion of the memory devices are configured as SLC devices that can receive fast data writes. Then, that stored data within the SLC memory devices are "folded" or transferred to higher density memory devices such as QLC memory devices. This allows for the balance of high transfer speeds and increased storage space. However, in various embodiments, because proof of space blockchain activities, such as plotting, require fast data write speeds to complete, the storage device can configure a namespace or partition to be a majority of SLC memory devices or even completely SLC memory devices. Subsequently, because it is known that the generated data will eventually be moved a fixed amount of time later, the folding operations can be suspended while proof of space blockchain activities are occurring.

Finally, additional embodiments can modify the use of error correction codes to better comport with proof of space blockchain activity usage. For example, it is known that utilizing error correction codes of longer length can increase the overall endurance of memory devices. However, the use of longer error correction codes can increase data read times; but since proof of space blockchain data, such as plots, are not read as often, the use of these extended codes can become beneficial when they would otherwise be disadvantageous. Similarly, the method in which the error correction code is encoded within the memory devices can be modified. Specifically, an interleaved programming can help increase overall memory device endurance. The performance costs associated with using these interleaved methods are negated by the proof of space blockchain activity patterns. Additionally, the increased endurance may be more beneficial to a user who is desiring to use the storage device as a plot generation device.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device with a storage device suitable for proof of space memory device optimization in accordance with an embodiment of the disclosure is shown. The proof of space consensus blockchain system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise a computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device (s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like. In many embodiments, the host client will be a proof of space blockchain logic that can make the host-computing device 110 act as a node within a proof of space consensus blockchain network. The embodiments depicted in FIG. 1 comprises a Chia node application host client. This embodiment may thus be configured to act as a Chia node on the Chia blockchain network.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations. As those skilled in the art will recognize, the number of, and location of the storage devices may change as needed. For example, in Chia node applications, the number of storage devices may increase as additional plots are created and set up for access during farming operations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). In many embodiments, the remote clients 117 will be comprised of other proof of space consensus nodes within that respective blockchain network. For example, in the embodiment depicted in FIG. 1, the remote clients 117 may comprise other Chia nodes and/or timelords within the Chia network. The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
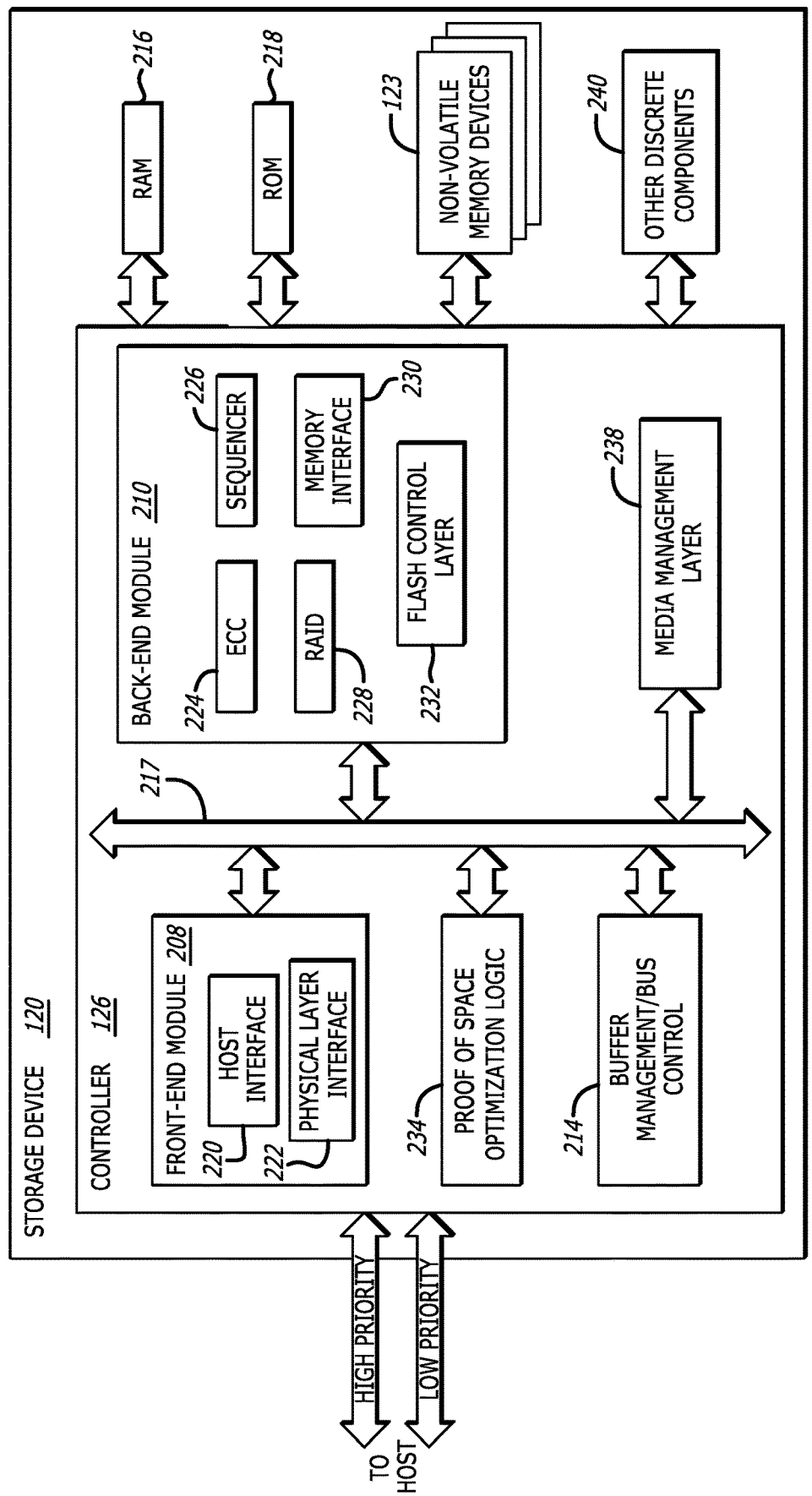
FIG. 2 is a schematic block diagram of a storage device suitable for proof of space memory array optimization in accordance with an embodiment of the disclosure.

Referring to FIG. 2, a schematic block diagram of a storage device suitable for proof of space memory array optimization in accordance with an embodiment of the disclosure is shown. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a proof of space optimization logic 234. In many embodiments, the proof of space optimization logic 234 can be configured to monitor data usage, received host commands, and partition conditions within the storage device 120. This monitoring can help determine if proof of space blockchain activities are occurring within the memory array. Additionally, the proof of space optimization logic 234 can be configured to receive and process commands received from the host-computing device such as, but not limited to, vendor specific commands that can also indicate the presence of or upcoming presence of proof of space blockchain activities. In additional embodiments, the proof of space optimization logic 234 can also modify the behavior of memory device operations including suspending certain background or garbage collection processes, configuring partitions or namespace to be SLC-majority or SLC-only, and/or modifying the use of error correction codes.

Figure 3:
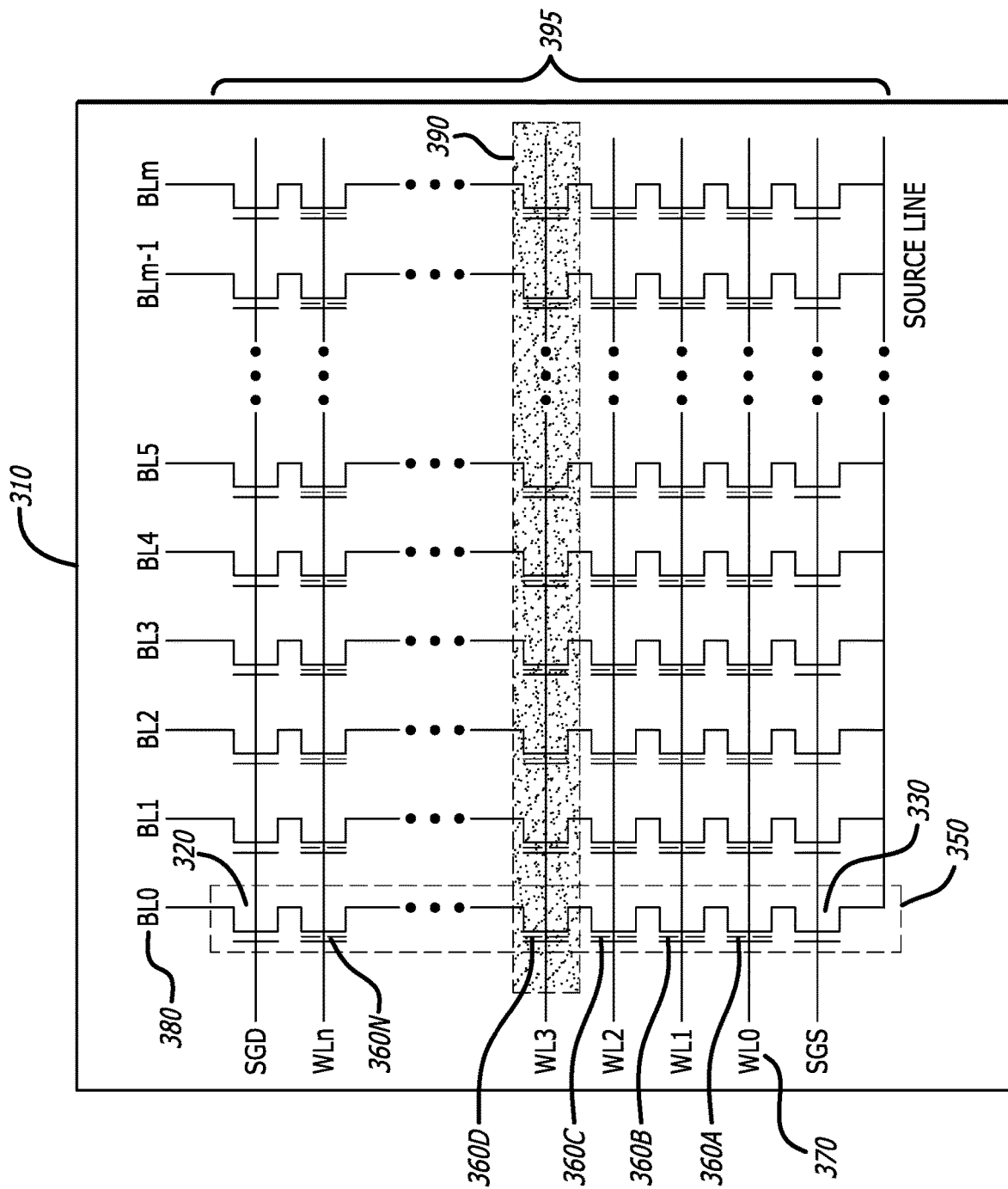
FIG. 3 is a conceptual schematic diagram of a two-dimensional memory array in accordance with an embodiment of the disclosure.

Referring to FIG. 3, a conceptual schematic diagram of a two-dimensional memory array 310 in accordance with an embodiment of the invention is shown. Memory devices, such as those depicted in FIGS. 1 and 2, may be arranged in two or three dimensions, such as a two-dimensional memory array or a three-dimensional memory array. FIG. 3 is a schematic diagram of one example of a two-dimensional memory array 310, such as a 2D or planar NAND memory array. The two-dimensional memory array 310 includes a set of NAND strings 350. Each NAND string 350 comprises a memory cells 360A, 360B, 360C, 360D to 360N. Each NAND string 350 includes a select gate drain transistor (SGD) 320 and a select gate source transistor (SGS) 330. The two-dimensional memory array 310 includes multiple pages 390. Page 390 is accessed by the control gates of the cells of the page connected in common to a word line 370 and each cell accessible via bit lines 380. In other embodiments, the memory cells may be arranged in other configurations. The sum of these groups of pages is considered a block 395. The memory block 395 can also be further arranged and configured with other memory blocks to generate larger memory structures as described in more detail below.

These memory blocks also typically have a finite lifespan, meaning that they will eventually fail over time. Specifically, each time the memory cell is written to, and erased, it may be harder to hold a proper charge such that a particular (and correct) piece of data may be retrieved from the cell. Thus, data storage manufacturer's configure various methods on storage devices to make sure wear within the storage device is spread across all blocks and memory devices somewhat equally to increase their overall endurance. Eventually though, there may be a point where it is not possible to reliably store data within the memory cell. These errors contribute to an overall bit error rate ("BER") that lead to a reduced lifespan of the storage device. Various embodiments described herein can attempt to increase the endurance of the memory devices by performing one or more optimizations that are suited for the data usage patterns of proof of space blockchain activities, such as those seen in Chia plotting.

Figure 4:
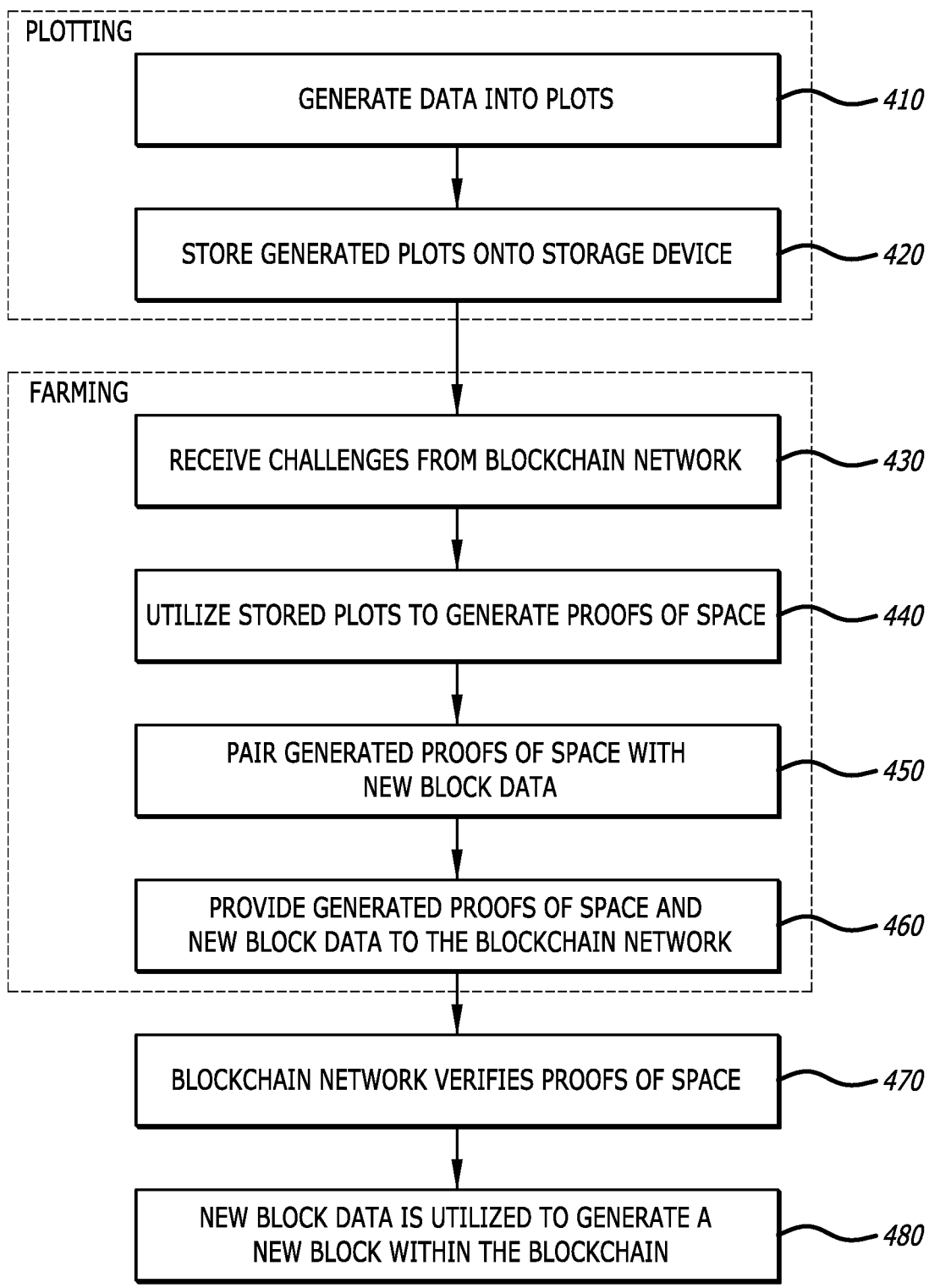
FIG. 4 is a flowchart depicting a process for mining cryptocurrency utilizing a proof of space consensus method in accordance with an embodiment of the disclosure.

Referring to FIG. 4, a flowchart depicting a process 400 for mining cryptocurrency utilizing a proof of space consensus method is shown. As discussed above, the mining of cryptocurrency can come in many forms. In a growing number of applications, cryptocurrency that uses a consensus method of proof of space can be utilized as an alternative to the currently more popular proof of work method. One example of a blockchain-based cryptocurrency that utilizes proof of space as a consensus method is Chia. Chia is centered on creating (i.e., "plotting") large quantities of proof of space consensus data that is formatted into one or more "plots." These plots are then stored on a storage device for future accessing in response to one or more challenges issued by the online Chia blockchain network. The plots comprise a series of hashed tables which may be accessed by the farmer in response to a challenge posed by the network. This process of storing the plots and providing them to the online Chia network for challenge processing is called "farming."

In a typical proof of space blockchain process 400 the plotting stage can begin by generating plots (block 410). Although Chia utilizes plots, some embodiments may be able to be formatted for use within other proof of space-based blockchain-based systems. In many embodiments, the generation of plot data involves the creation of a plurality of tables comprising cryptographic hashes that may be nested, self-referential, or otherwise related. In various embodiments, the hashes created through a back propagation method and are then sorted and compressed throughout the tables. The plots are completed and stored onto a storage device (block 420). This generation of plots creates a lot of input and output processes within the storage device and benefits from high-speed storage devices. This results in many users utilizing SSDs for plotting operations. However, the nature of many SSDs and their increased cost and finite endurance leads to many users copying the generated plots to a secondary storage device that is more configured for long-term storage.

The farming stage of proof of space consensus blockchain system comprises all of the remaining steps. Farming can begin by receiving one or more challenges from the blockchain network (block 430). The exact type of challenge may vary based on the cryptocurrency process used. For example, the challenge may be a problem that must be solved within a certain time and/or in a particular format.

The process 400 can utilize the stored plots to generate proofs of space (block 440). These proofs of space are required of the challenge answers that allow the user to attempt to add their contribution to the blockchain and reap a reward. In a variety of embodiments, the generated proofs of space are paired with new block data (block 450). New block data can include a proposed data block to add to the blockchain. Those skilled in the art will understand that this new block data may be comprised of sub-blocks or any other proposed block data as required by the blockchain being utilized.

The paired proofs of space and new block data is transmitted onto the blockchain network (block 460). The transmitted data is not automatically added to the blockchain but needs to satisfy one or more requirements as more than one user on the network may have submitted a valid proof to the challenge. During the selection of a potential new block, the blockchain network will verify the submitted proofs of space (block 470). This can be done in a variety of ways depending on the exact blockchain used. Once the blockchain network has settled on a particular block candidate that was submitted, the new block data is utilized to generate a new block within the blockchain (block 480).

Figure 5:
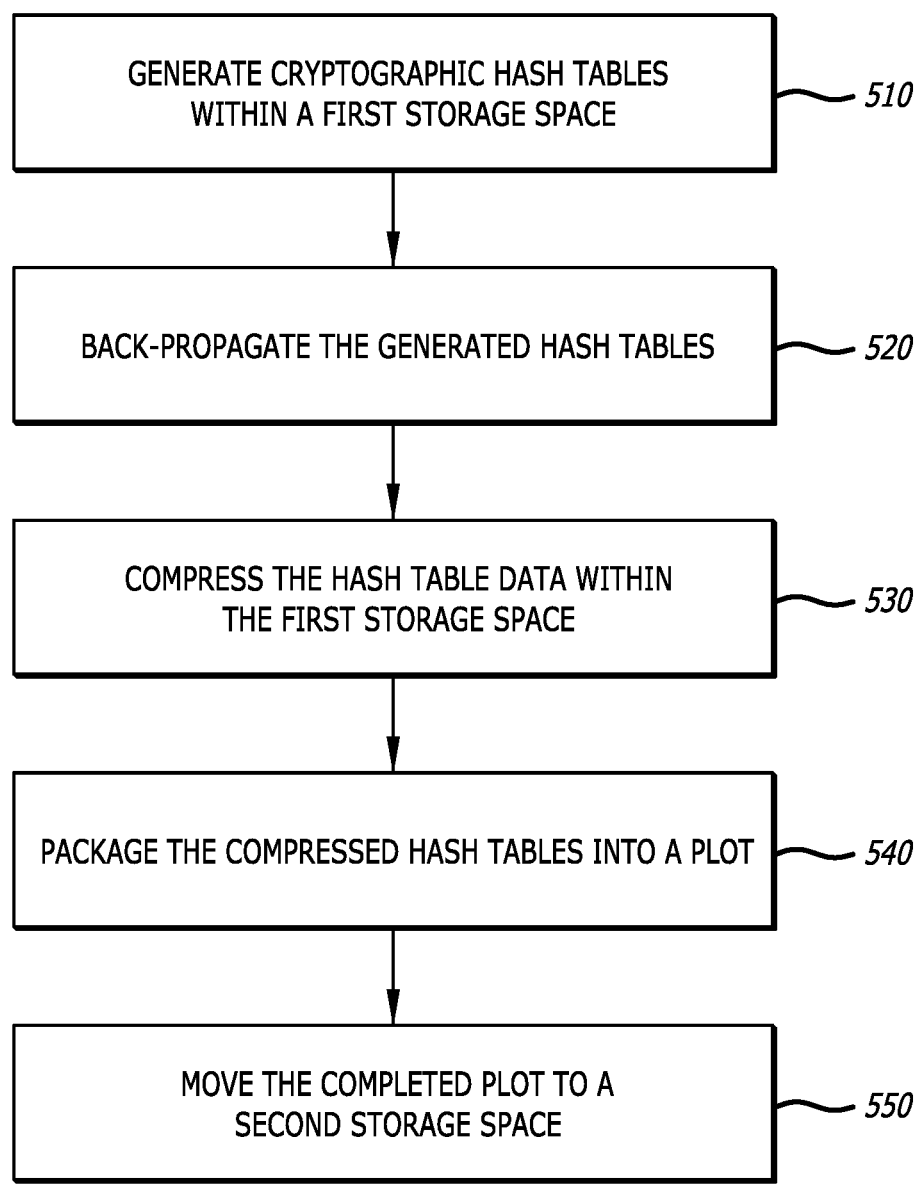
FIG. 5 is a flowchart depicting a process for processing and storing a plot of data associated with a proof of space consensus method in accordance with an embodiment of the disclosure.

Referring to FIG. 5, a flowchart depicting a process 500 for processing and storing a plot of data associated with a proof of space consensus method is shown. In many embodiments, the plotting may be done by a Chia-based client application. The Chia-client, such as a Chia node application, may begin the process 500 by generating a plurality of cryptographic hash tables within a first storage space (block 510). The user of the Chia-client may have configured the first storage space as a high-speed storage space or at least a high-speed partition within the storage device.

In a variety of embodiments, once the cryptographic hash tables have been generated, they may be back-propagated through the tables (block 520). This process may involve a number of calculations and require a significant amount of time and/or input and output resources to process. In further embodiments, this hash table data can be compressed within the first, high-speed storage space (block 530). These compressed hash tables can be formatted into a compressed single package, which may be dubbed a "plot" (block 540). For example, in Chia, the size of a plot may exceed one-hundred gigabytes in size. Upon completion of the plot packaging, the process 500 can facilitate transfer of the completed plot to a second storage space which is typically configured to longer-term storage (block 550). This process of generating and storing plots of data for farming can create a unique set of demands for storage devices. As such, embodiments discussed below attempt to better optimize the memory array and other storage device operations to better compensate for these unique demands.

Figure 6:
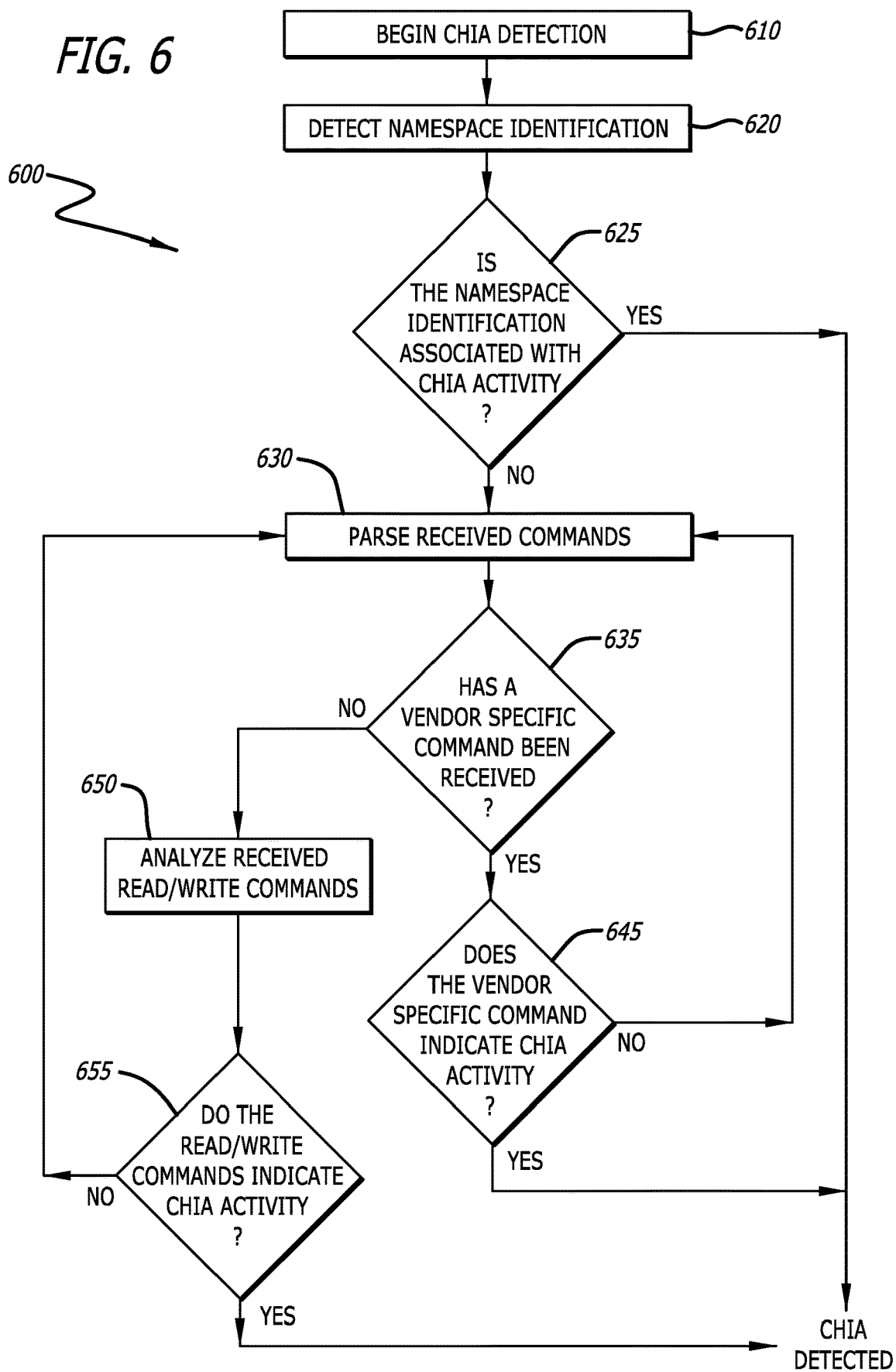
FIG. 6 is a flowchart depicting a process for detecting the use of proof of space blockchain activities within a storage device in accordance with an embodiment of the disclosure.

Referring to FIG. 6, a flowchart depicting a process 600 for detecting the use of proof of space blockchain activities within a storage device in accordance with an embodiment of the disclosure is shown. As described in more detail within subsequent figures, many embodiments can utilize and enact various measures to optimize the use of the memory devices within the memory array of the storage device upon detection of certain proof of space blockchain activities. Detection of these activities then is thus crucial to this optimization. Although the embodiment depicted in FIG. 6 is directed to Chia blockchain activities, it will be understood by those skilled in the art that these embodiments may be utilized by any proof of space-based blockchain operations.

The process 600 can begin by enabling the Chia detection process (block 610). The specific steps utilized to detect Chia activities may vary based on the storage device and can be done over multiple steps and/or methods. In the embodiment depicted in FIG. 6, the process 600 can first detect a namespace identification (block 620). Often, namespace identifications can be associated with specific types of activities. These associations may be within a particular standard, but often they are vendor specific and may be preprogrammed during storage device manufacturing. The process can analyze the detected namespace identification and determine if it is associated with Chia activity (block 625). For example, a specific namespace identification number or data may match to a predetermined item that indicates that the particular namespace should be configured for Chia or other proof of space blockchain activities. If the namespace identification is associated with such activity, then the process 600 can indicate that for further processing.

The process 600 may further parse received commands, such as those from a host-computing device (block 630). The storage device will receive various commands over time directing it to store, read, and otherwise process data. Those commands can be analyzed to determine if a vendor specific command has been given (block 635). As those skilled in the art will recognize, vendor specific commands can be commands issued to the storage device that aren't specifically defined within the usual communication specification/protocol. These vendor specific commands can be utilized and sent by the host to communicate unique actions, data, or other signals, which can often be utilized to direct the storage device to act in a particular manner.

The process 600 can determine if a received vendor specific command indicates that Chia activity is occurring (block 645). For example, a vendor may preconfigure a storage device to process a specific type of vendor specific command to indicate that a particular memory array, namespace, or other partition should be configured or otherwise processed for proof of space blockchain activities. When the vendor specific command matches this preconfigured data, the process 600 can act accordingly to indicate that Chia activities are detected.

However, even without the presence of vendor specific commands, the process 600 can further analyze the over received commands, especially the read and write commands (block 650). As those skilled in the art are aware, proof of space blockchain activities, specifically Chia activities, have unique read and write command patterns. For example, when plotting data, there are often many write commands but very few read commands. Analyzing data patterns such as these can allow storage devices to identify when proof of space blockchain activities are occurring within one or more memory devices within the memory array (block 655). When no command patterns and no vendor specific commands are present, the process 600 can continue to monitor and parse subsequently received commands (block 630). However, when the analyzed patterns do indicate proof of space blockchain activity, the process 600 can indicate and act upon detected Chia activity. Such actions and processes are outlined in further detail below.

Figure 7:
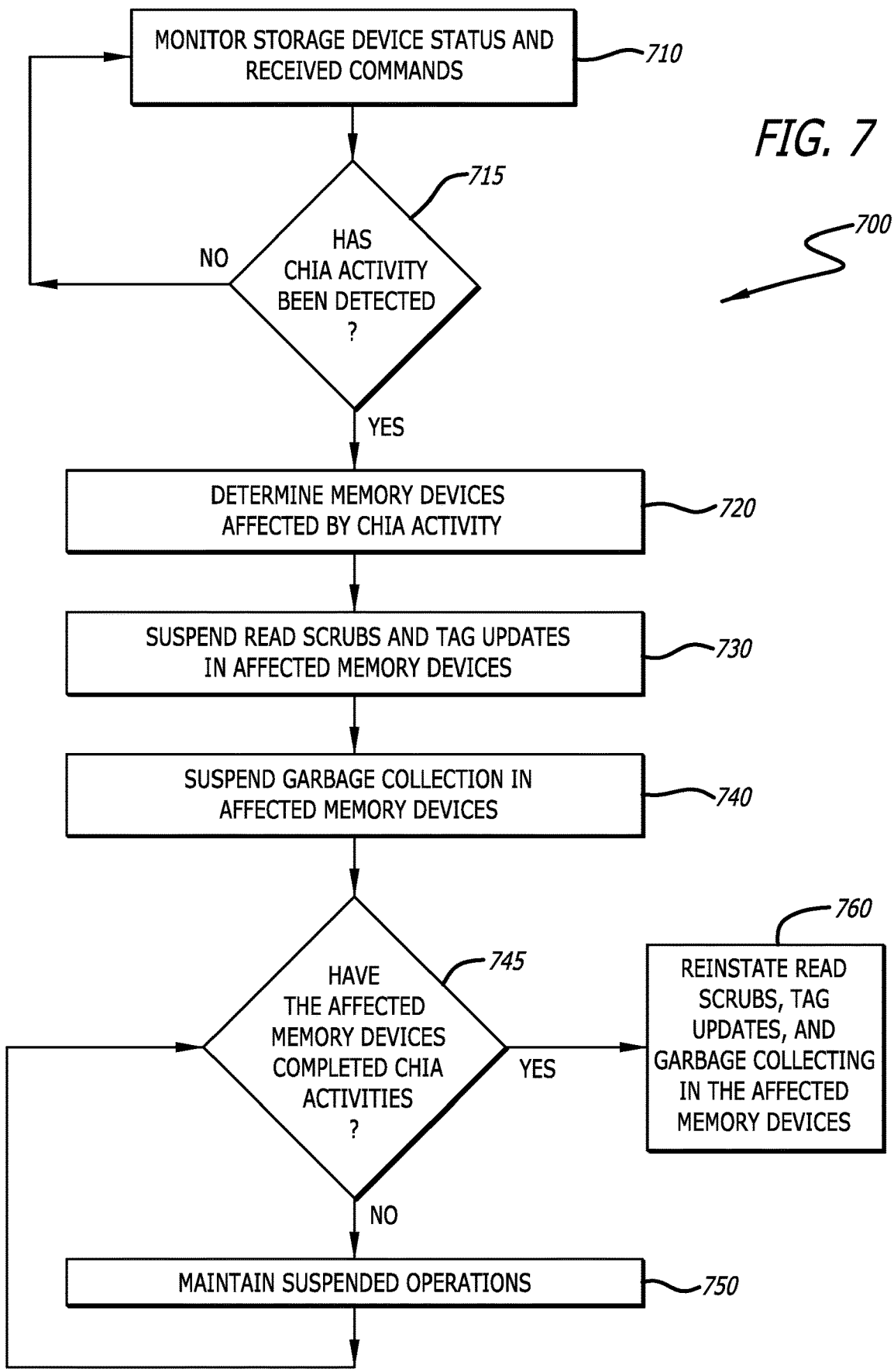
FIG. 7 is a flowchart depicting a process for suspending one or more background operations upon the detection of proof of space blockchain activities in accordance with an embodiment of the disclosure.

Referring to FIG. 7, a flowchart depicting a process 700 for suspending one or more background operations upon the detection of proof of space blockchain activities in accordance with an embodiment of the disclosure is shown. As discussed previously, the process 700 can monitor the storage device status and any received commands, such as those from a host-computing device (block 710). A determination can be made on whether Chia activity has been detected or not (block 715). When no Chia activity is present, the storage device can continue to monitor any subsequent status or received command (block 710).

However, when Chia activity has been detected, the process 700 can determine which memory devices are being or will be affected by the detected Chia activity (block 720). As previously discussed, the storage device may receive a command indicating that a particular namespace to be established may have a namespace identification that indicates that it will be utilized for some proof of space blockchain activities. In other embodiments, the storage device may determine from monitored commands received that an already existing portion of the memory array is currently being utilized for Chia or other proof of space blockchain activities. Once determined, the affected memory devices can have one or more attributes or related activities affected to help optimize usage for Chia activities.

In a number of embodiments, the process 700 can suspend read scrubs and time and/or temperature tag updates in affected memory devices (block 730). As those skilled in the art will recognize, the plotting stage will usually take a relatively short amount of time to complete and is not very read intensive. Therefore, these generated plots have a reduced data retention and associated read disturb problems which results in a lower-than-average bit error rate ("BER") and low variations between the data as almost all written data will be of the same age. As a result, the read scrubs and time and or temperature tag updates are not as necessary when dealing with these types of proof of space blockchain activities such as plotting within Chia.

Furthermore, in more embodiments, the process 700 can suspend garbage collection within the affected memory devices being utilized for proof of space blockchain activities (block 740). For example, plotting can often take up a predefined working space. Currently, plots are often generated within two-hundred and fifty-six gigabytes of data. The final plot that is generated is often less than half of the original utilized space. Because of the formulaic or deterministic usage of data within these proof of space blockchain activities, many garbage collection activities can be suspended as the data within the generating plot will have a known expiration data. Avoiding unnecessary evictions will save storage device operation time and endurance.

During this period of operation, these procedures can be suspended. However, the process 700 can check periodically if the affected memory devices have completed their Chia-based activities (block 745). If these proof of space blockchain activities are still occurring, then the suspended operations can be maintained as suspended (block 750). When it is determined that the Chia or other proof of space blockchain activities are complete within one or more memory devices, the processes can be reinstated such as read scrubs, tag updates, and garbage collecting (block 760). It is contemplated that for each function or process that was suspended, then that respective process will be resumed. Further optimization methods are described below.

Figure 8:
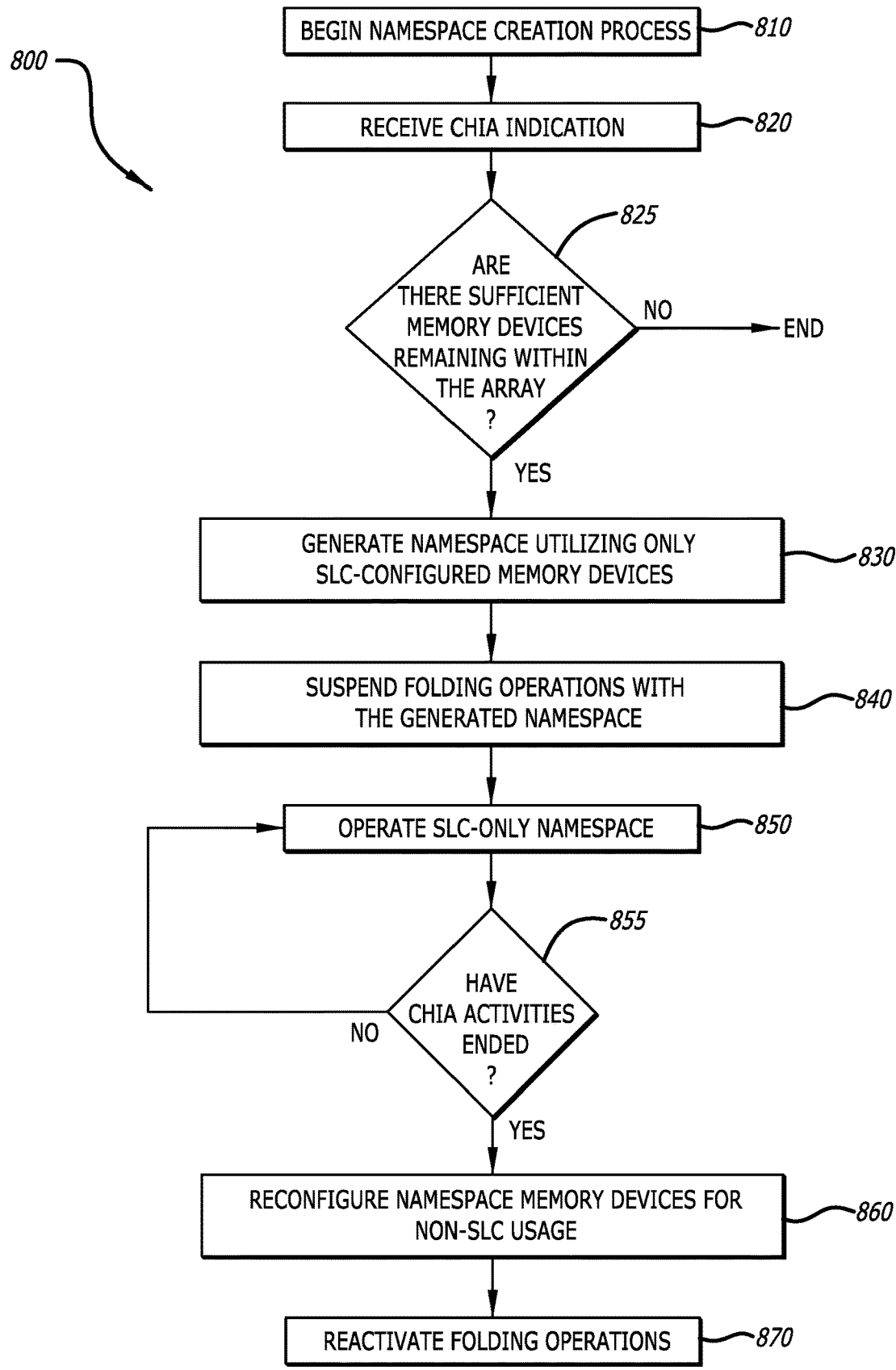
FIG. 8. is a flowchart depicting a process for configuring single level cell majority namespaces upon the detection of proof of space blockchain activities in accordance with an embodiment of the disclosure.

Referring to FIG. 8, a flowchart depicting a process 800 for configuring single level cell majority namespaces upon the detection of proof of space blockchain activities in accordance with an embodiment of the disclosure is shown. In various storage devices, the memory devices within a memory array may be configured for different uses. For example, a memory device may be configured to act as a single-level cell (SLC) memory device, a tri-level cell (TLC) memory device, or a quad-level cell (QLC) memory device, etc. These different configurations offer certain benefits and drawbacks. For example, higher level cell memory devices can store more data within the same amount of memory devices, but also have an increased chance of generating errors. Conversely, SLC memory devices have a lower error rate and can be written to faster but store less data. Often, a folding process may be implemented that writes incoming data onto a batch of SLC memory devices to sustain higher write speeds, but when operations are less demanding, may "fold" that SLC-written data to higher capacity TLC or QLC memory devices.

However, when a namespace is being generated that will be dedicated for proof of space blockchain applications, it may be desired to have more SLC memory devices to allow for faster writing overall. Thus, an SLC-majority or SLC-only namespace may be generated for proof of space blockchain namespaces to increase performance. A process 800 for doing this may begin by starting a namespace creation process (block 810). During the creation of the namespace, the process 800 may receive an indication that the namespace will be utilized for Chia plotting or some other proof of space blockchain activity (block 820). In certain embodiments, the generated namespace may have some indication data associated with it. For example, a generated namespace may be assigned or otherwise be associated with a particular namespace identification. The identification may be in the form of a number or other data. The namespace identification can be used to signal what the namespace will be utilized for. In these embodiments, the storage device may have namespace identification data that is preconfigured for Chia or proof of space blockchain activities. Thus, if a namespace with the identical namespace identification is being created, then the storage device can respond as if the namespace will be utilized for Chia or other proof of space blockchain activities that can benefit from SLC-majority or SLC-only namespaces.

The process 800 can determine if there are sufficient memory devices remaining within the memory array to allow for the generation of a SLC-majority or SLC-only namespace (block 825). If not enough memory devices are available, then the process can end. This may happen if too many block or other memory devices are already configured as non-SLC memory devices, or if the available memory devices are otherwise non-configurable to SLC operations. However, when there are enough memory devices available, the process 800 can generate the namespace utilizing only SLC-configured memory devices (block 830). It is contemplated that certain embodiments may configure the namespace with a majority of SLC memory devices, and that a certain threshold may be required before allowing the generation of an SLC-majority namespace.

Since the SLC-majority and/or SLC-only namespaces will be limited to only being processed within their respective namespace, the process 800 can suspend folding operations within the generated namespace (block 840). In this way, additional overhead processing resources can be freed up for other tasks that may further optimize the operations of the storage device. Then, upon generation, the SLC-only or SLC-majority namespace can be operated as needed (block 850). Typically, this process involves generating one or more plots such as for Chia plotting operations.

Once the plotting or other proof of space blockchain activities are completed, the data within the namespace is often moved to another partition, namespace, memory array, or even storage device. Traditional memory array operations can subsequently be resumed. Therefore, the process 800 can periodically check to determine if the Chia or other proof of space blockchain activities have ended (block 855). This determination may be from a vendor specific command received from the host, analyzing the patterns of memory device usage, reception of a data transfer command, or other means.

When they have not ended, further operations may continue (block 850). However, when the Chia or proof of space blockchain activities have ended, the memory devices within the namespace can be reconfigured for non-SLC usage (block 860). In some embodiments, the reconfiguration may not change the operation of the memory devices until a subsequent command is received to utilize the memory devices. Additionally, the process 800 can reactivate the folding operations within the namespace or respective memory devices (block 870). Other memory device operations, such as error correction codes described below in FIGS. 9-12, may also be restored to non-Chia or proof of space blockchain activity status.

Figure 10A:
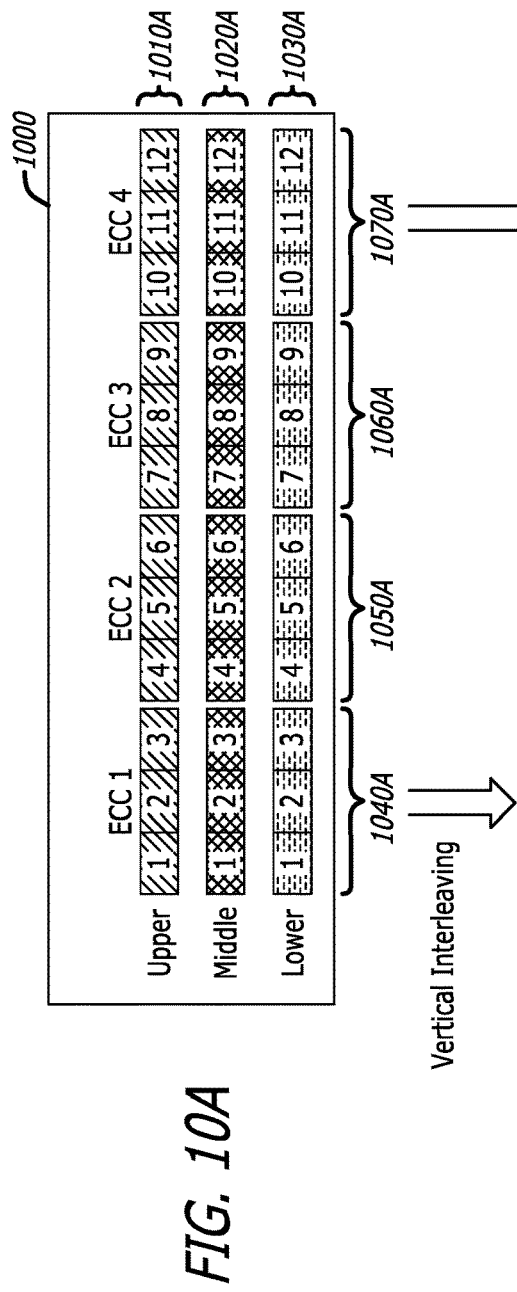
FIG. 10A is a conceptual diagram depicting a series of error correction codes programmed within a plurality of memory device pages in accordance with an embodiment of the disclosure.

Referring to FIG. 9, a flowchart depicting a process 900 for modifying the use of error correction codes upon the detection of proof of space blockchain activities in accordance with an embodiment of the disclosure is shown. As those skilled in the art will recognize, error correction codes ("ECCs") are data codes utilized in techniques for correcting errors in the memory devices which may become corrupted or otherwise exhibit bit errors. Utilizing internal ECC mechanisms can help to detect and ultimately correct data that contains a certain number of errors. While many types and methods of ECC encodings may be utilized, embodiments discussed herein will be conceptually simplified for ease of understanding. For example, as shown in FIG. 10A, an ECC may be distributed as a string of data across a single page of a word line. However, other methods of ECCs may be utilized.

In many embodiments, ECCs may be utilized with an interleaved pattern. In short, an interleaved pattern can provide improved data fidelity and increased robustness to page-to-page bit error rate variations. The ECC data or "word" is often stored across multiple pages and perhaps across multiple word lines. This process is described in more detail within the discussion of FIGS. 10B-C. However, it should be understood that most implementations of an interleaved ECC encoding process have associated costs. In most cases, the cost of utilizing an interleaved is a general degradation or performance hit in random data reads. Since each ECC spans several pages, multiple sense operations are required which can reduce the speed at which reads are performed.

The process 900 for modifying ECC encoding can begin upon the receiving of an indication of Chia or other proof of space blockchain activity (block 910). Upon receipt, the process 900 can begin utilizing an interleaved ECC coding process (block 920). The interleaved process can be utilized to encode a plurality of error correction codes across multiple logical pages within the memory array (block 930). As discussed below with respect to FIGS. 10B-C, there are multiple ways to interleave an ECC pattern.

In certain embodiments, the process 900 may also extend the length of the error correction code (block 940). As shown in the chart depicted in FIG. 12, the use of extended ECCs can increase performance compared to shorter ECCs. The use of extended ECCs can provide an increased level of correction capability within the memory array. This increase correctability improves overall endurance of the memory array. Typically, extended ECCs are not utilized because they require an increased read time, which is less useful for proof of space blockchain activities such as Chia plotting which may perform many writes, but relatively few read operations.

These modified ECC encoding operations may be performed for the duration of use within the proof of space blockchain activities. However, the process 900 will periodically check whether the Chia or other proof of space blockchain activities have stopped (block 945). When they have not ceased, the process 900 can again continue to encode a plurality of error correct codes across multiple logical pages within the memory array (block 930). If it is detected that Chia or other proof of space blockchain activity has ended, the process 900 can restore normal error correction code activities within the memory array, partition, or affected memory devices (block 950). More detailed examples of the interleaving process are described below.

Referring to FIG. 10A, a conceptual diagram depicting a series of error correction codes programmed within a plurality of memory device logical pages 1010A-1030A in accordance with an embodiment of the disclosure is shown. A conceptual page of memory devices 1000 is shown comprising a plurality of memory blocks 1040A, 1050A, 1060A, 1070A which each comprise a plurality of memory devices which each have an upper logical page 1010A, middle logical page 1020A, and lower logical page 1030A. In traditional error correction code encoding, each error correction code can be written across the same page, meaning that sequential data may be written and accessed on the same upper, lower, or middle page. This is represented by the sequential numbered blocks within each page sharing the same shading. When utilizing interleaved patterns, two examples are vertical interleaving and checkerboard interleaving, both of which are described in more detail below.

Figure 10B:
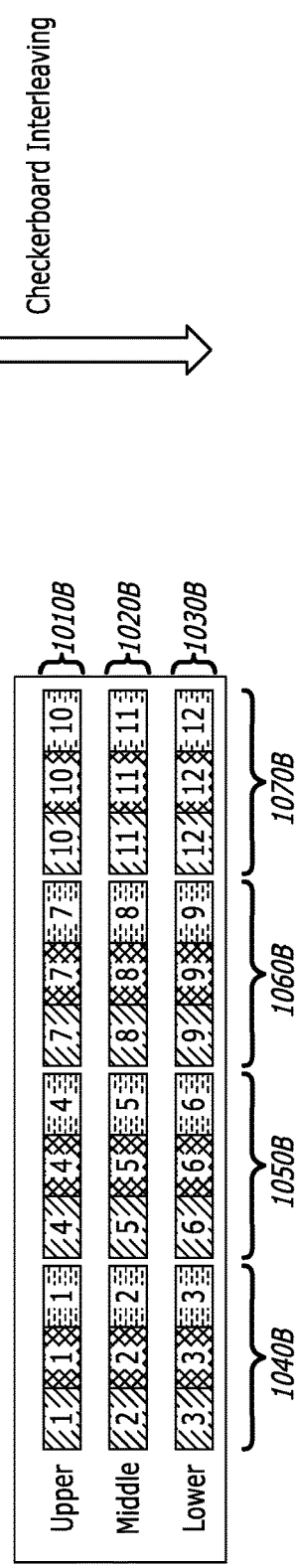
FIG. 10B is a conceptual diagram depicting a series of error correction codes programmed in a vertical interleaving pattern within a plurality of memory device pages in accordance with an embodiment of the disclosure.

Referring to FIG. 10B, a conceptual diagram depicting a series of error correction codes programmed in a vertical interleaving pattern within a plurality of memory device pages 1010B-1030B in accordance with an embodiment of the disclosure is shown. The error correction codes programmed across the memory devices in this embodiment are not simply across each upper logical page 1010B, middle logical page 1020B, or lower logical page 1030B. Instead, the ECC is programmed sequentially across the three logical pages 1010B-1030B and across the four memory blocks 1040B, 1050B, 1060B, 1070B. In this way, each memory block such as the first memory block 1040B comprises different parts of the same ECC codeword as in the encoding method depicted in FIG. 10A. However, instead of each portion of the ECC being programmed on each individual logical page 1010B-1030B, the same data is programmed across each of the logical pages 1010B-1030B. Thus, the upper logical page 1010B only comprises the first portion of each of the error correction codes, while the middle logical page 1020B only comprises the second portion of each error correction code, and so forth. This same pattern is repeated across each of the memory blocks 1040B, 1050B, 1060B, 1070B.

Figure 10C:
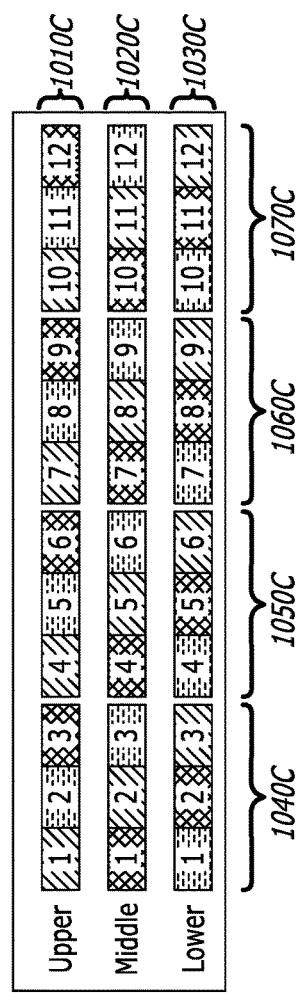
FIG. 10C is a conceptual diagram depicting a series of error correction codes programmed in a checkerboard interleaving pattern within a plurality of memory device pages in accordance with an embodiment of the disclosure.

Referring to FIG. 10C, a conceptual diagram depicting a series of error correction codes programmed in a checkerboard interleaving pattern within a plurality of memory device logical pages 1010C-1030C in accordance with an embodiment of the disclosure is shown. Again, similar to the encoding patterns of FIGS. 10A-B, each of the memory blocks 1040C, 1050C, 1060C, 1070C comprise the same error correction code data, but is ordered differently. However, instead of ordering the ECC data sequentially across each page, as in FIG. 10B, the data is staggered across the logical pages 1010C, 1020C, 1030C. The staggering can be accomplished in a variety of ways.

The embodiment depicted in FIG. 10C utilizes a first portion of a first portion of a first ECC data in the first slot of the upper logical page 1010C of the first memory block 1040C, following with a second portion of a second ECC data in the second slot, and a third portion of a third ECC data in the third slot. In fact, each memory page within this staggered arrangement comprises a first portion of data in a first slot, a second portion of data in a second slot, and a third portion of data in the third slot; the only difference between this embodiment and the one depicted in FIG. 10A is that the ECC data changes with each slot. The selection of which ECC data to utilize is staggered or shifted each slot along the page. Unlike the vertical interleaving embodiment depicted in FIG. 10B, the process to read the ECC data requires reading across not only multiple pages, but also in multiple slots of the memory block for each page. The benefits of utilizing this interleaved encoding is shown in more detail in the graph described below.

Figure 11:
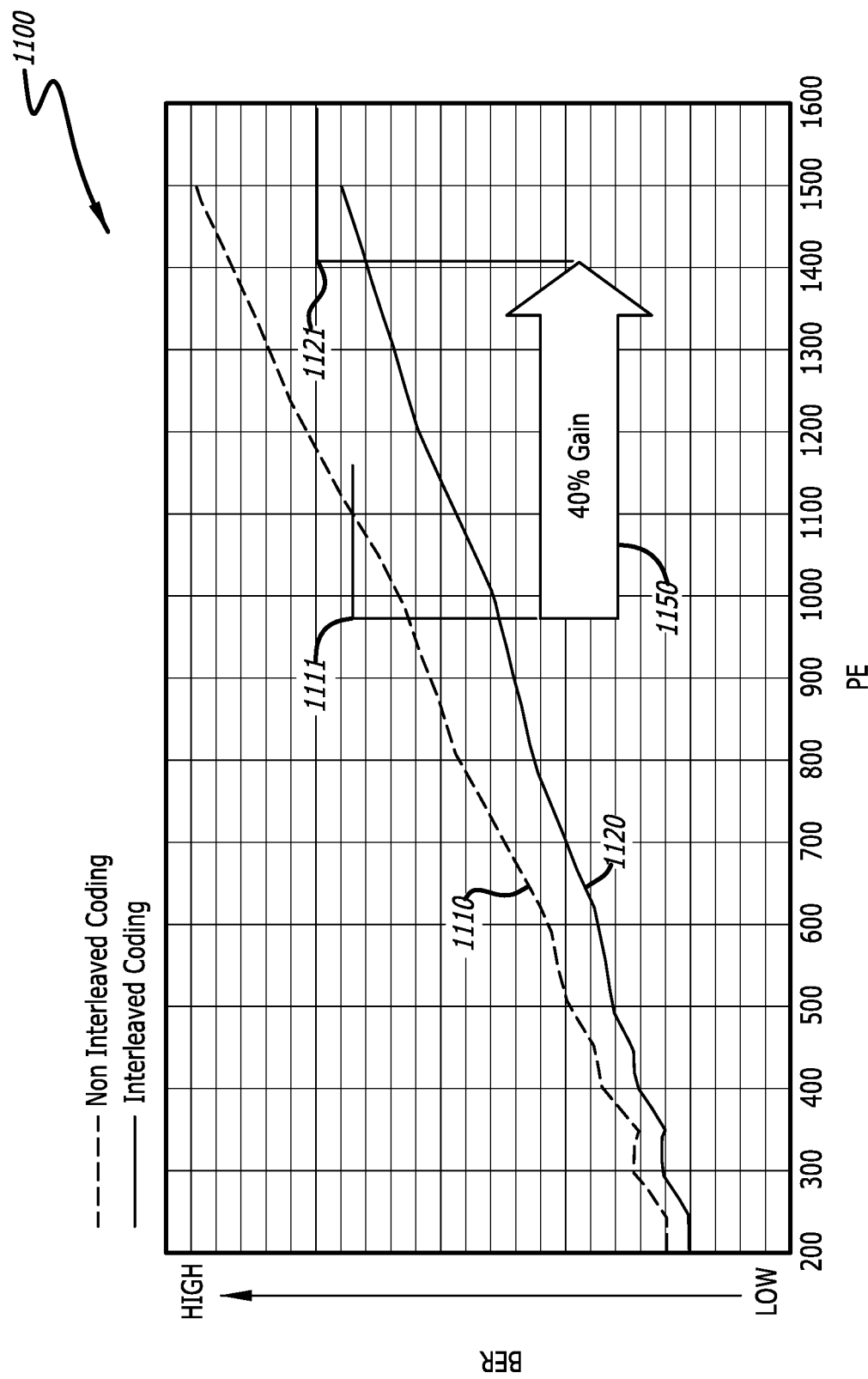
FIG. 11 is a chart depicting the difference in bit error rates between interleaved and non-interleaved error correction code encoding.

Referring to FIG. 11, a chart 1100 depicting the difference in bit error rates between interleaved and non-interleaved error correction code encoding is shown. The chart 1100 comprises a two-dimensional graph with a vertical axis associated with an overall chance of a bit error rate (BER) being above a worst-case threshold, while the horizontal axis is associated with the number of program/erase ("PE") cycles performed on the memory devices. In practice, this chart can be graphed by cycling the memory devices through different number of programs and erase operations and then determining the bit error rate of certain blocks within the memory devices. This process can be repeated with a non-interleaved encoding and an interleaved encoding.

Because many ECC codewords are tested, the overall error rate is not a single value, but a distribution of many values. When quantified, the vertical axis can be measured against a worst-case threshold such as a 5.3 sigma value which equates to the probability that the measured bit error rate lies on a distribution past a 5.3 sigma deviation (which can be calculated to be approximately the lowest 0.0000001% of the distribution). The non-interleaved encoded plotted line 1110 is graphed against the interleaved encoded plotted line 1120. It can be seen that for both plotted lines 1110, 1120, that as the number of program cycles increase, the overall BER percentage increases. Eventually, there will come a point that the ECC decoder will not be able to correct the incorrectly programmed memory device. For the non-interleaved encoding, the first correction limit 1111 indicates where the non-interleaved encoded plotted line 1110 crosses, indicating that at approximately 975 PE cycles, the non-interleaved encoded memory devices lost their ability to be corrected. Conversely, the second correction limit 1121 indicates where the interleaved encoded memory reaches its respective correction limit. The interleaved encoding plotted line 1120 crosses this second correction limit 1121 at approximately the 1410 PE cycles. This indicates that utilizing interleaved ECC encodings can yield an approximate forty percent increase 1150 in memory device endurance.

Figure 12:
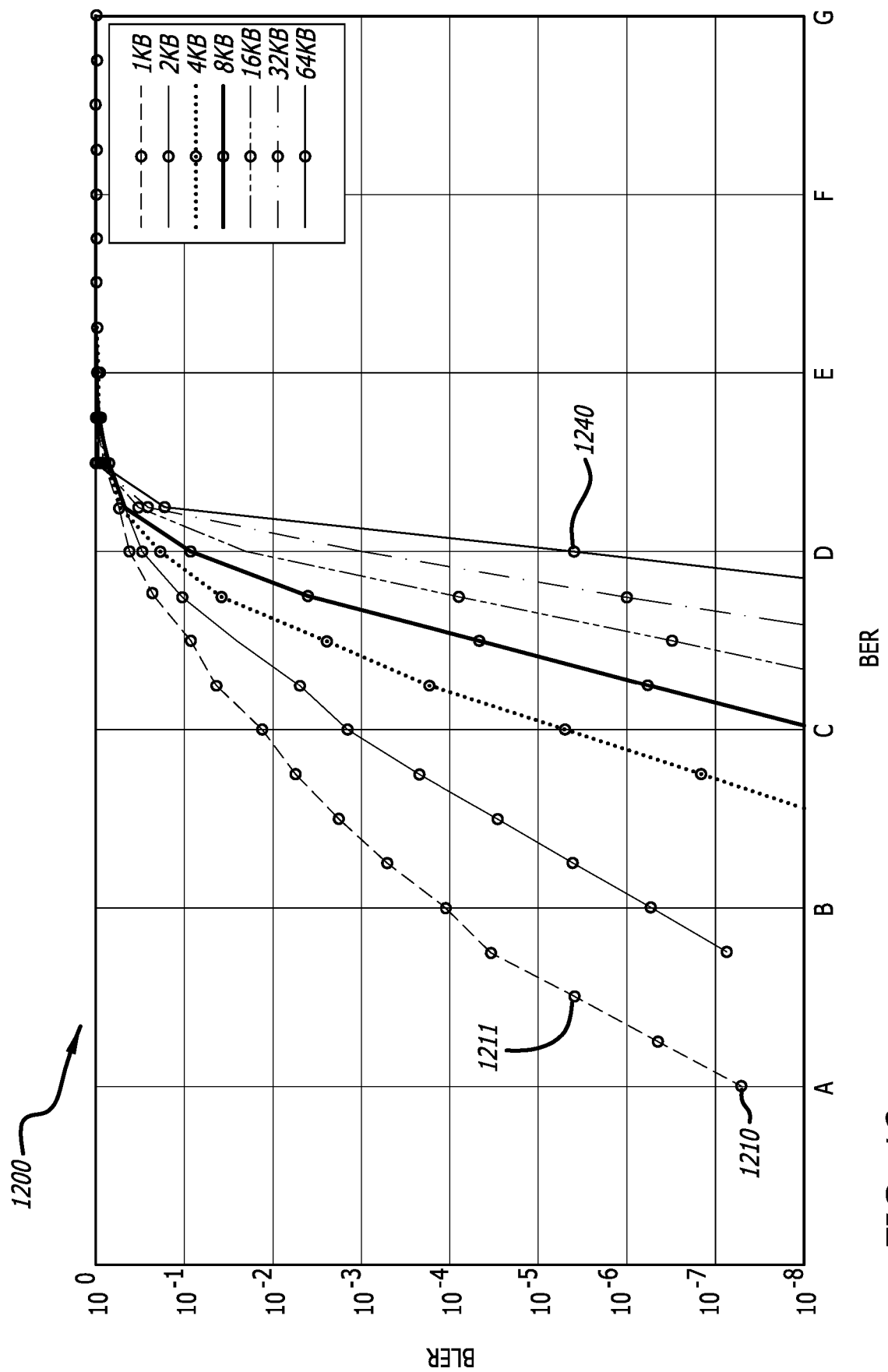
FIG. 12 is a chart depicting the differences in error correction capabilities of various code length lengths.

Referring to FIG. 12, a chart depicting the differences in error correction capabilities of various code length lengths is shown. The chart 1200 comprises a two-dimensional graph with a vertical axis associated with an overall block error rate (BLER) indicating the probability of a decoder to fail, while the horizontal axis is associated with the mean bit error rate percentage (BER %). In practice, this chart can be graphed by programming data with the selected ECC, cycling the memory devices through certain number of programs and erase operations, determining the bit error rate of those memory devices and the associated block error rate. This process can be repeated with a different sizes of error correction code lengths.

As can generally be seen, the longer the error correction code used, the less likely the decoder will fail. For example, at the first data point of the 1 KB error correction code length data line 1210, a measurable chance of failing can be found to be as low as 0.9 percent mean bit error rate. No other higher ECCs at longer lengths have similar chances for failure at this point. Likewise, at the third data point of the 1K error correction code length data line 1211, an increased chance between $10^{-5}$ and $10^{-6}$ occurs when the mean BER approaches approximately the point between A and B. Compare this same chance with the first data point on the 64 KB error correction code length data line 1240 which has a similar chance of failure, but has an increased mean bit error rate around point D. This process can yield approximately a 0.25 percent increase in bit error rate which translates to higher endurance.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:
1. A device comprising:
a processor;
a memory array comprising:
a plurality of memory devices;
wherein the plurality of memory devices is configurable into one or more namespaces; and
a proof of space optimization logic configured to:
monitor a device status to determine whether one or more proof of space blockchain activities has been detected;
determine that at least a portion of the memory devices are being utilized for one or more proof of space blockchain activities;
in response to proof of space blockchain activity not being detected, continuing to monitor one or more subsequent status or receive commands;

suspend one or more background operations for the portion of memory devices being utilized for the one or more proof of space blockchain activities; and reinstate, upon a determination that the proof of space blockchain activities have ended, the one or more background operations for the portion of memory devices utilized.

2. The device of claim 1, wherein the at least a portion of the memory devices are configured within a namespace.

3. The device of claim 2, wherein the determination that at least a portion of the memory devices are being utilized for one or more proof of space blockchain activities is based on analyzing namespace identification data.

4. The device of claim 3, wherein the determination that at least a portion of the memory devices are being utilized for one or more proof of space blockchain activities is in response to namespace identification data matching namespace identification data previously associated with proof of space blockchain activities.

5. The device of claim 1, wherein the determination that at least a portion of the memory devices are being utilized for one or more proof of space blockchain activities is based on receiving a vendor specific command.

6. The device of claim 1, wherein the determination that at least a portion of the memory devices are being utilized for one or more proof of space blockchain activities is based on analyzing received host commands.

7. The device of claim 6, wherein analysis of the received host commands includes comparing memory device read and write activities with known proof of space blockchain activity patterns.

8. The device of claim 1, wherein the one or more background operations includes read scrubs.

9. The device of claim 1, wherein the one or more background operations includes updating time tags.

10. The device of claim 1, wherein the one or more background operations includes garbage collection.

* * * * *